United States Patent [19]

Wicks, III

[11] Patent Number: 5,312,205
[45] Date of Patent: May 17, 1994

[54] PIPELINE TO REDUCE LOSS FROM BREACH

[75] Inventor: Moye Wicks, III, Houston, Tex.

[73] Assignee: Shell Oil Company, Houston, Tex.

[21] Appl. No.: 38,411

[22] Filed: Mar. 29, 1993

[51] Int. Cl.$^5$ ............................................. F16L 1/04
[52] U.S. Cl. ................................ 405/74; 137/247.41; 285/114; 405/169; 405/158
[58] Field of Search ...................... 405/74, 21, 73, 52, 405/169, 170, 158; 285/114; 137/247.41, 247.46, 247.11, 251

[56] References Cited

U.S. PATENT DOCUMENTS

| | | | |
|---|---|---|---|
| 180,859 | 8/1876 | Falk | 137/247.41 X |
| 593,430 | 11/1897 | O'Meara | 405/74 |
| 606,980 | 7/1898 | Poincy | 405/74 |
| 891,580 | 6/1908 | Wilker | 137/247.41 X |
| 2,948,306 | 8/1960 | Kuraeff | 285/114 X |
| 3,196,894 | 7/1965 | Bodi | 137/247.41 X |
| 4,645,377 | 2/1987 | Vesterby | 405/21 X |
| 5,149,227 | 9/1992 | Parks | 405/21 X |

OTHER PUBLICATIONS

"Settlers—Gravity Settlers; Decanters" (Incl. FIG. 21-86) from *Perry's Chemical Engineers' Handbook*, Sixth Edition, Edited by Don W. Green, (McGraw-Hill:New York, 1984) pp. 21-64 and 21-65.

*Primary Examiner*—Dennis L. Taylor

[57] ABSTRACT

The present invention relates to a subsea pipeline and method utilizing the pipeline wherein the loss of pipeline contents resulting from a break in the pipeline is reduced. The loss of pipeline contents is reduced by providing a plurality of traps in the pipeline. The traps each comprise at least two elevation changes in alternating directions. Any water entering the pipeline through a breach will only displace pipeline contents from the breach to the adjacent lower trap.

6 Claims, 1 Drawing Sheet

FIG.1.
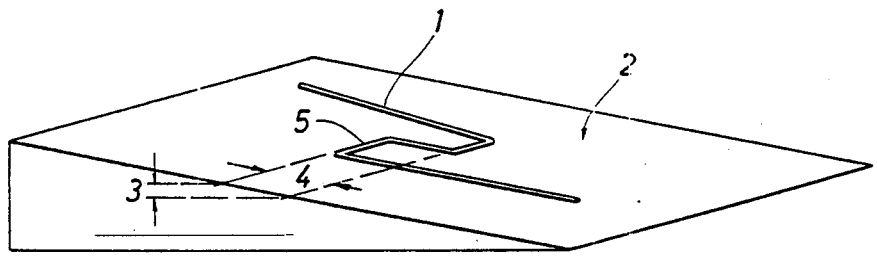
FIG.2
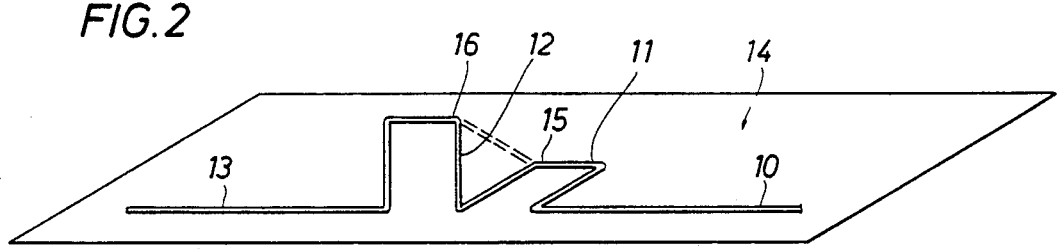
FIG.3
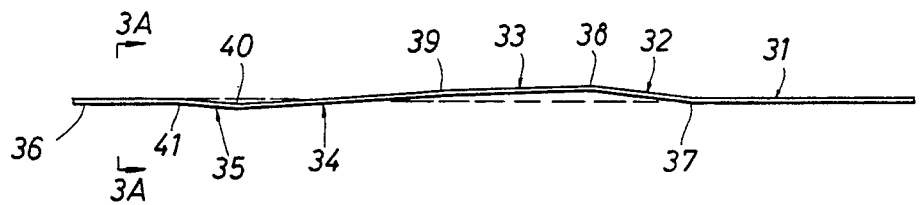
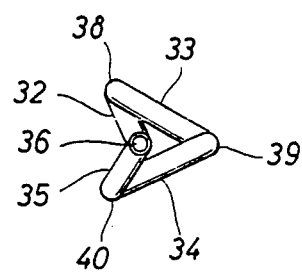
FIG.3A

PIPELINE TO REDUCE LOSS FROM BREACH

FIELD OF THE INVENTION

The present invention relates to a subsea pipeline wherein the loss of pipeline contents resulting from a break in the pipeline is reduced.

BACKGROUND TO THE INVENTION

Considerable volumes of crude oil are produced from off-shore facilities, whether from platforms or from subsea wellheads. Production of crude oil from these facilities typically requires that the crude oil be transported to on-shore facilities through pipelines. Additionally, crude oil and refined hydrocarbon products are often transported across bodies of water through subsea pipelines. These subsea pipelines are designed and installed to operate with a low probability of failure because of the high cost of repairing such failure and because of the desire to minimize any environmental impact resulting from such a failure. In spite of this low probability of failure, it is still desirable to further minimize the consequences of a failure of a subsea pipeline.

It is therefore an object of the present invention to provide a subsea pipeline wherein the amount of oil leaked from the pipeline is reduced. It is a further object to provide such a pipeline that can be installed, pigged, and otherwise operated in a conventional manner.

SUMMARY OF THE INVENTION

These and other objects are accomplished by providing a subsea pipeline for transportation of contents that are immiscible with water and less dense than water, the pipeline comprising a plurality of traps, each trap comprising at least two elevation changes in alternating directions with each elevation change being of a magnitude of at least one pipe diameter. Any water entering the pipeline through a breach will only displace pipeline contents from the breach to the adjacent lower trap. Oil floating in the trap will prevent water from migrating past the trap location and displacing additional contents of the pipeline out a breach in the pipeline.

The double elevation changes of the present invention additionally provide flexibility in the pipeline and can accommodate some thermal expansion of the pipeline.

BRIEF DESCRIPTION OF THE FIGURES

FIG. 1 is a schematic drawing of the pipeline of the present invention laid on an upsloping incline.

FIG. 2 is a schematic drawing of a segment of a pipeline that can function as a trap of the present invention.

FIG. 3 is a schematic drawing of an addition embodiment of a segment of a pipeline that can function as a trap of the present invention.

FIG. 3A is a view of the pipeline of FIG. 3 from an end of the pipeline segment.

DETAILED DESCRIPTION OF THE INVENTION

Referring now to FIG. 1, a segment of a pipeline of the present invention, 1, is shown laid on an inclined seafloor, 2. A S-shaped loop, 5, is incorporated in the segment where the direction of the pipe is reversed for a distance, 4, that is enough for an elevation change, 3, that is at least the diameter of the pipe. The elevation change, 3, is preferably at least twice the diameter of the pipe, and is more preferable between two and ten pipe diameters. When the pipe diameters are referred to herein, it is to be understood as the internal diameter of the pipe. If the segment is in relatively shallow water, the segment can be prefabricated with two relatively sharp 180 degree bends to accommodate the elevation changes with a minimal amount of material. If the segment is to be placed in relatively deep water, straight segments of pipe can be laid from a pipe laying ship or barge, and the changes in direction made by changing the position of the pipe laying barge or ship in a manner that will not cause damage to the pipeline such as buckling.

Referring now to FIG. 2, an embodiment of the present invention is shown that is useful in the event that the seafloor on which the pipeline rests is relatively flat. The elevation changes are provided by incorporating in the pipeline, 10, a first loop, 11, and a second loop, 12, incorporated at different angles from the central axis of the pipeline, 12. The angles in this embodiment are preferably about 90 degrees from each other. Having two loops ensures that one of the two will be in a plane different than the horizonal plane. The loops may each return to the central axis of the pipe segment, as is shown in solid lines, or the extremities of the loops may be joined by a connecting segment, as shown by the segment drawn in dashed lines. The elbows of the loops are shown as 90 degree bends, but more gradual bend, such as 45 degree bends are preferred because they will provide less resistance to flow within the pipeline and will be less likely to present a problem if the pipeline is pigged.

Relatively sharp bends in pipelines are difficult to lay in relatively deep water because the pipelines are fabricated on a ship or barge, and lowered to the sea floor by being extended over the ship or barge on a "stinger." The stinger extends from the ship to a depth of 50 to about 100 feet, and provides some initial support for the pipeline. The pipeline is supported on the ship or barge by a tensioner. The tensioner must hold the suspended weight of the pipeline to permit pipe segments to be added one at a time to the pipeline on the deck of the ship or barge. Sharp bends in the pipeline could be impossible to pass through typical tensioners, and could be plastically deformed by the weight of the pipeline suspended from the tensioner if the water depth were great enough.

To avoid sharp bends and provide a pipeline that can be passed through a stinger, placed on the seafloor below a considerable depth of water, and not be plastically deformed, a pipeline segment such as that of FIG. 3 and FIG. 3A can be provided. Referring now to FIGS. 3 and 3A, a pipeline, 31, is shown with an initial bend, 37, in a plane about 30 degrees from vertical. The plane of the initial bend can be any plane, and the orientation that the segment rests on the sea floor does not matter. The initial bend may be a bend of, for example, between 2 and 10 degrees from the initial central axis of the pipeline. The second bend, 38, is preferably in a plane that is rotated about 30 degrees from the plane of the first bend, and be an angle of about twice the angle of the first bend. The pipe segment between the first and the second bends, 32, is sufficiently long that the pipe at the second bend is displaced from the initial central axis of the pipeline by at least one pipe diameter, and preferably at least two pipe diameters. The straight run of pipe after the second bend, 33, is about twice the length of the pipe between the first and the second bend. A third bend, 39 follows the straight run of pipe after the second bend, 33. The third bend is preferably of about the same angle as the second bend, 38, but in a plane that is rotated from the plane of the second bend by about 60 degrees. A run of pipe after the third bend, 34, is of a length similar to that of the segment between the second and third bend, 33. The run of pipe after the third bend is followed by a fourth bend, 40. The fourth bend is preferably of an angle similar to the second and third bends, and in a plane that includes the central axis of the initial centerline of the pipeline, 31, and the end of the run of pipe, 34. A final bend in the pipeline segment, 41, causes the pipeline to continue along the centerline of the initial pipeline segment, 31.

These bends cause the pipeline to "corkscrew" around the initial axis of the pipeline such that no matter how the pipeline lays on the seafloor, there is at least enough elevation change to cause a trap according to the present invention. The planes of the bends are preferably rotated by 30, 60, 60 and 30 degrees in order to ensure a high point with an minimal number of bends and length of pipe. Further, the bends can be of sufficiently small angles to pass through a tensioner and not be plastically deformed as they are laid from a pipeline laying ship or barge. Segments of pipe can be cold-bent on shore, and incorporated in the pipeline as it is fabricated on the ship at intervals such that a plurality of traps are provided in the pipeline.

Like the embodiment of FIG. 2, the embodiment of FIG. 3 and 3A can be useful when the seafloor has little or no slope.

A pipeline according to the present invention may include traps of different designs and dimensions, so long as a plurality of traps are provided. The traps are preferably provided at intervals of one half mile to three miles in order to limit the amount of oil that would be displaced into the body of water due to a breach in the pipeline.

The foregoing descriptions and attached figures are exemplary of the present invention and reference to the following claims is made to determine the scope of the present invention.

I claim:

1. A method to reduce loss of oil into a body of water through which it is to be transported, the method comprising the steps of:
   providing a subsea pipeline for transporting oil; and
   providing within the pipeline a plurality of traps, each trap comprising at least two elevation changes in alternating directions and each elevation change being of a magnitude of at least one pipe diameter thereby limiting the loss of oil being transported through the pipeline which may occur from a breach between two adjacent traps.

2. The method of claim 1 wherein the pipeline is on a sloping seafloor and the trap is provided by reversing the direction of the pipeline on the seafloor for a distance sufficient to provide the elevation of change of at least one pipe diameter.

3. The method of claim 1 wherein the double elevation changes are separated by less than two miles.

4. The method of claim 1 wherein each elevation change is greater than about two pipe diameters.

5. The method of claim 4 wherein the double elevation changes are separated by less than about two miles.

6. The method of claim 1 wherein each elevation change is between about two and about ten pipe diameters.

* * * * *